(12) United States Patent
Whitner (10) Patent No.: US 10,097,433 B2
(45) Date of Patent: Oct. 9, 2018

(54) DYNAMIC CONFIGURATION OF ENTITY POLLING USING NETWORK TOPOLOGY AND ENTITY STATUS

(71) Applicant: Richard Bennett Whitner, Fort Collins, CO (US)

(72) Inventor: Richard Bennett Whitner, Fort Collins, CO (US)

(73) Assignee: CA, Inc., New York, NY (US)

( * ) Notice: Subject to any disclaimer, the term of this patent is extended or adjusted under 35 U.S.C. 154(b) by 267 days.

(21) Appl. No.: 14/674,841

(22) Filed: Mar. 31, 2015

(65) Prior Publication Data

US 2016/0294603 A1      Oct. 6, 2016

(51) Int. Cl.
*H04L 12/24* (2006.01)
*H04L 12/26* (2006.01)

(52) U.S. Cl.
CPC ........ *H04L 43/0817* (2013.01); *H04L 43/024* (2013.01); *H04L 41/22* (2013.01)

(58) Field of Classification Search
CPC .............................. H04W 72/231; H04B 7/024
See application file for complete search history.

(56) References Cited

U.S. PATENT DOCUMENTS

| | | | | |
|---|---|---|---|---|
| 5,436,909 A | * | 7/1995 | Dev ..................... | G06F 11/2257 706/916 |
| 7,028,228 B1 | * | 4/2006 | Lovy ................... | G06F 11/3495 714/47.2 |
| 7,296,194 B1 | * | 11/2007 | Lovy ................... | G06F 11/0709 709/224 |
| 2011/0078352 A1 | * | 3/2011 | Williamson ........ | G06F 11/0748 710/220 |
| 2013/0286852 A1 | * | 10/2013 | Bowler ............... | H04L 41/0677 370/242 |
| 2014/0126416 A1 | * | 5/2014 | Yu ......................... | H04W 84/20 370/254 |
| 2015/0113338 A1 | * | 4/2015 | Maruyama .......... | G06F 11/3037 714/48 |

* cited by examiner

*Primary Examiner* — Robert M Morlan
*Assistant Examiner* — Pamit Kaur
(74) *Attorney, Agent, or Firm* — Baker Botts L.L.P.

(57) ABSTRACT

A method includes polling a plurality of entities in a network for status information at a first polling frequency and receiving a fault indicator associated with an entity in the network. The method additionally includes mapping the fault indicator to a particular node in a network topology, the network topology comprising nodes corresponding to entities in the plurality of entities and edges describing relationships and dependencies between the plurality of entities, wherein the particular node corresponds to the associated entity for the fault indicator. The method further includes determining a set of related nodes based on connections to the particular node in the network topology, and polling corresponding entities for the set of related nodes for status information at a second polling frequency, the second polling frequency being greater than the first polling frequency.

20 Claims, 5 Drawing Sheets

DYNAMIC CONFIGURATION OF ENTITY POLLING USING NETWORK TOPOLOGY AND ENTITY STATUS

BACKGROUND

The disclosure relates generally to entity polling, and more specifically to dynamic configuration of entity polling using network topology and entity status.

SUMMARY

According to one embodiment of the disclosure, a method includes polling a plurality of entities in a network for status information at a first polling frequency and receiving a fault indicator associated with an entity in the network. The method additionally includes mapping the fault indicator to a particular node in a network topology, the network topology comprising nodes corresponding to entities in the plurality of entities and edges describing relationships and dependencies between the plurality of entities, wherein the particular node corresponds to the associated entity for the fault indicator. The method further includes determining a set of related nodes based on connections to the particular node in the network topology, and polling corresponding entities for the set of related nodes for status information at a second polling frequency, the second polling frequency being greater than the first polling frequency.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Infrastructure management tools provide network visibility to IT administrators, enabling maintenance of business services and applications hosted in complex IT infrastructures. Infrastructure management solutions can help organizations optimize operational efficiency while reducing complexity, cost, and hassle associated with use and integration of multiple network monitoring tools. These tools often include network monitoring systems including connectivity monitoring for network devices such as routers, switches, servers, applications, printers, and many other network devices. Probes or agents can verify network and TCP-based connectivity and report back to a central monitoring system for tracking and analyzing real-time network information. These systems may additionally include dashboards and alarms for creation and customization of network monitoring interfaces showing up-to-the-minute status of critical network information including information regarding network links, bandwidth utilization, network latency, response times, and other critical network issues.

These systems allow businesses to track and manage network availability and performance parameters such as network interface utilization, error rates, connectivity failures, latency and any other technical items from a service-level perspective. These systems additionally deliver availability, performance, and service level management for heterogeneous IT networks in a solution that automatically discovers network devices and interfaces and monitors device health and performance, providing bandwidth performance and analysis reporting for critical networks. Network availability and performance information is presented in graphical dashboards and reports via a secure, multi-tenant web portal that enables enterprises and service providers to efficiently deliver information to internal or external business audiences.

In certain embodiments, devices connected to a network are automatically discovered and configured for polling or monitoring, significantly reducing the amount of set-up or configuration time. Thus, administrators may initialize monitoring for thousands of network devices and interfaces in a relatively short period of time. Filters can be applied to select particular devices for bulk manual configuration operations.

Special probes and gateways provide automated and user-driven access to device status information. Probes may have their own interface to facilitate administrative and operational activities. For example, network and application connectivity monitoring probes may be deployed to ensure end users and business consumers have access to business-critical network devices. Any IP-enabled device may be monitored, including routers, switches, servers, printers, and the like. Specialized probes use ICMP ECHO tests to verify network connectivity between the host on which the probe resides and the targeted remove system. Probes may also test connectivity to TCP-based services, such as Telnet and HTTP, as well as any other application with a designated service port for monitoring.

Network monitoring systems may record response times to and from network devices, services and applications to aid in pinpointing areas of excessive network latency. Network connectivity status reports and round trip performance trends are generated and leveraged for service level agreement creation, monitoring, and reporting.

Network monitor probes may provide flexible deployment options to ensure connectivity between the applications and network devices that warrant close scrutiny. In certain embodiments, lightweight network connectivity probes can be deployed strategically throughout a business infrastructure. For example, in a distributed application environment, network connectivity probes can be deployed directly on application servers and can be configured to test connectivity to end users who require access to business-critical servers. Network connectivity probes may additionally be deployed directly on end-user workstations to monitor for connectivity to the applications' servers.

Alerts and other notifications may be generated in response to detected or inferred problems with network devices. For example, if a network link between a probe and an infrastructure management console is disabled, the probe can buffer alert and performance data locally until the disabled communication link is re-enabled. Thus, network and device monitoring data is not lost due to agent connectivity issues.

Simple network management protocol (SNMP) pollers may also be used to manage devices on IP networks. SNMP includes an application layer protocol, a database schema, and a set of data objects, and is supported by routers, switches, servers, workstations, and printers. SNMP data monitoring probes enable tracking the performance of these network devices against a management information base for managing entities in a communication network.

The teachings of the present disclosure present an infrastructure management system with network monitoring functionality that monitors network devices generally and increases or improves the polling rate of certain network devices based on relationships, associations, and other connections in a device topology. Components can be polled more or less frequently based on indicators of problems with a device or component. Topology is one source of indicators. For example, problems with one node may provide a system with an indication that components corresponding to neighbors of that node should be monitored more frequently. Device status or health is another such indicator. For example, performance issues may be detected with respect to a particular component. As another example, a polling system may be unable to contact a particular device. These events may prompt more frequent polling until the health of those components improves.

In certain embodiments, polling of devices may be modified based relationships in a device topology between a group of related devices and a device or link experiencing fault conditions, errors, or alerts. For example, polling frequency may be modified based on the relationships in a device topology. After resolution of the error condition in the particular network device or link, the polling frequency may again be adjusted, for example, back to normal polling frequency levels. In certain embodiments, the polling frequency is adjusted between several levels before returning to a normal state, in accordance with the polling frequencies for other devices in the network topology.

As used herein, the terms devices or components may refer to virtually any managed entity, whether implemented in hardware or software, whose status can be monitored. For example, these entities may include physical devices, drives, memory, processors, routers, hubs, switches, transmission lines, virtual components, virtual machines, appliances, operating systems, applications, services, and the like.

Similarly, these managed components or nodes may exhibit managed relationships with other managed components or nodes. For example, a service may be hosted on a particular server. Accordingly, managed relationships may be traversed in order to locate neighbors and alter their polling frequency.

For example, services for a web application may be monitored, and polling of related components and/or topology nodes may be configured accordingly based on the status or performance of that service. In one particular embodiment, a shopping cart service for a web application is monitored in accordance with a monitoring system that monitors the status and/or health of a variety of applications, services, and virtual/physical computing components. When the shopping cart service exhibits an increasing number of dropped transactions, more frequent monitoring may be employed to monitor the load on the shopping cart server which hosts the shopping cart service. In this example, the managed relationship between the shopping cart service and the host server is traversed, and the polling frequency of the related components is modified.

Certain legacy device polling systems may poll all network devices at a standard polling frequency. The polling frequency may be set so as to not overwhelm the network. For example, in a polling system configuration for collecting device data from connected devices in a managed network, the sheer volume of polling messages may delay other critical network communications from being transmitted. For example, polling packets transmitted in a packet-switched network to each of the devices connected to a large-scale IT infrastructure may create a substantial amount of network traffic that does not immediately service a customer or user need. Thus, this traffic may be categorized as low priority traffic. While certain mechanisms may exist to give priority to higher priority network traffic, the transmission of these additional network packets may even still delay the higher priority network traffic due to bandwidth or volume related network bottlenecks.

Further, when polling is conducted periodically, that is at a predetermined frequency, the volume of polling packets transmitted on the network increases linearly as time passes. This can create a strain on limited network resources, such as routers and the like, especially during peak traffic or utilization times. Further, the resources being polled must use system resources to respond to the polling inquiry. For example, the system must gather utilization information and status information and package and transmit a response message in response to the polling message.

Standard polling frequency may be manually adjusted, such as by a system administrator for a large or specialized group of devices connected to a network; however, the polling frequency may remain constant. The teachings of the present disclosure contemplate a system of dynamically modifying device polling frequencies based on relationships in a device topology. Device polling frequency may be automatically modified to achieve a goal, such as increased status awareness and sensitivity for particular network devices when a related network device is in an error state or satisfies some other threshold or condition. Dynamic configuration of device polling may be implemented based on indicators of problems with a particular device including device topology and/or device status.

Polling frequencies may be increased for only those components or devices related to or impacted by a failed device or component. The impacted components may be determined by referencing a device topology. Thus, polling frequencies may scale up for the most important devices while remaining low for other devices. This approach minimizes negative impact on network traffic and improves diagnosis and status monitoring of those devices that are more likely to be seriously impacted by component errors.

In certain embodiments, a device topology may be constructed by discovering devices connected to a network and discovering information regarding relationships and connections between the devices. The devices may be represented in the topology by nodes, with edges between each node representing a relationship between the devices in the network. Relationships may include physical network connections, virtual system relationships, and shared attributes, properties or the like. The topology may represent a variety of physical and virtual system components, and may be displayed in a graphical representation so that an administrator can quickly identify network devices and status information regarding the health of a managed network.

For example, an infrastructure management system maintains information regarding managed devices, including operating system, device type, connection type, IP address, device name, component type, status information, utilization information, memory capacity, CPU capacity, hard drive capacity, and virtually any other property of a connected device. In certain embodiments, SNMP polling is used to determine values for each of these properties for each connected device. Each of these devices may be represented in a device topology, for example, by nodes in the topology. Each node in the topology may be connected by one or more edges to another component in the topology. The edges may represent various relationships such as physical or virtual connections. For example, a server hosting a number of virtual machines is represented with an edge between the server and each virtual machine. In this case, the edge represents the relationship between the server and each hosted virtual machine. However, edges may represent other relationships, such as a relationship between devices connected by a network, or that devices share some properties or characteristics. Further devices that are associated with a particular application or service may be represented as being connected by an edge in the network topology. The network topology may thus indicate that the devices service the same application via edges in a device topology map.

Figure 1:
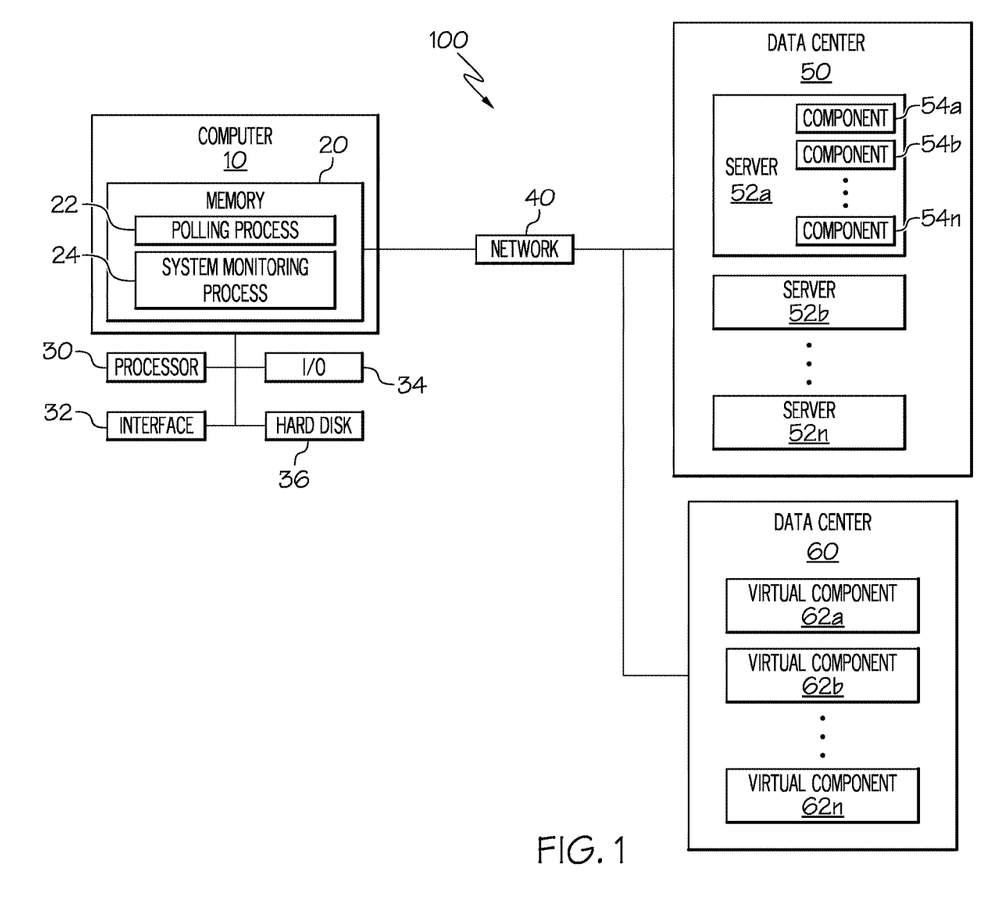
FIG. 1 illustrates a block diagram of a system for dynamic configuration of device polling using network topology in accordance with a non-limiting embodiment of the present disclosure.

With reference to FIG. 1, a system 100 for dynamic configuration of device polling using network topology is illustrated in accordance with a non-limiting embodiment of the present disclosure. System 100 includes a computer 10, network 40, data center 50 with physical server components and data center 60 with virtual server components. Computer 10 includes a memory 20, processor 30, interface 32, input/output 34, and hard disk 36. Processor 30 loads and executes instructions from hard disk 36 in memory 20. For example, processor 30 executes a polling process 22 and a system monitoring process 24. Data center 50 includes various physical server components. Components may include any device capable of being connected to a network. For example, components may include any addressable device or device capable of being assigned an IP address. In certain embodiments, components may encompass computing units as small as configuration items. Accordingly, server 52a includes components 54a-n which include various computing components and devices. Components also include virtual computing components as illustrated with respect to data center 60.

System monitoring process 24 may be an infrastructure management process that manages various systems for tracking and maintaining a large IT infrastructure such as data centers 50 and 60. Polling process 22 may be one aspect of system monitoring process 24. For example, polling process 22 may poll managed network devices for status information at a predetermined polling rate and may store the status information in a database. The polling information may have value as historical data points for trend analysis and other intelligence processes in connection with system monitoring process 24 or other applications.

Polling process 22 may poll each component in data centers 50 and 60 at a predetermined polling rate. The polling rate may be manually configured by an administrator or otherwise automatically set for each component by the system.

System monitoring process 24 may use polling information and other information from device discovery processes to construct a network device topology map of data centers 50 and 60. The device topology map includes nodes corresponding to each component, such as components 54a-n and 62a-n. System monitoring process 24 may additionally construct edges in the topology map corresponding to relationships between each component. For example, components 54a-n may share a relationship based on their configuration in server 52a. Thus, an edge may be constructed in the device topology map between each node corresponding to component 54a-n and/or between each node corresponding to component 54a-n and server 52a.

System monitoring process 24 may additionally analyze real-time polling data from polling process 22 to detect, for example, error or fault conditions at a particular component or server in the IT infrastructure. In certain embodiments, system monitoring process 24 may use additional data sources or may receive notifications from components or other monitoring applications or databases regarding alarm or fault conditions in a network component or device.

System monitoring process 24 may map the fault or error condition to a particular node in the device topology. For example, errors, faults, or alerts may be associated with one or more particular components in the network. The system monitoring process maps the received faults, errors, and alarms to particular corresponding nodes in the device topology. The mapping process may use information in any received alerts or alarms to determine affected components. Thus, system monitoring process 24 may make determinations as to which components are the source of a particular error or fault. In certain embodiments, errors or faults are triggered by system monitoring process 24 based on monitoring data for a particular component varying from a particular threshold range. In such scenarios, the system may simply map the error to the corresponding node in the device topology.

In certain embodiments, system monitoring process 24 determines components or devices that are associated with the component experiencing the error state. For example, when the infrastructure management process determines that error conditions have manifested or occurred at a first network device, system monitoring process 24 determines devices that are connected to or related to the first network device. In certain embodiments, devices or components that may be affected by the error to the first network device are determined. The system may make a determination as to which devices would be affected by an error in a particular network device based on the type of error or the relationship between the devices as expressed by the network topology.

System monitoring process 24 instructs polling process 22 to modify the polling frequency, intensity, interval, or the like for the related components. For example, when the system indicates that a router is down, the system determines which components might be, or are, affected by the router being down. The system next determines an appropriate polling interval for those affected components. The appropriate polling interval may be sufficiently high so that interested parties and applications can be updated quickly on device status changes. Thus, the polling frequency may be increased in this scenario.

In this example the system may undertake a cost benefit analysis regarding increasing the polling frequency for the related network components. The cost benefit analysis may include considering the costs in terms of network latency or delay caused by increased polling operations in comparison to the benefits gained by interested applications or users being kept abreast of these updates.

Polling process 22 proceeds to poll the related devices at a higher frequency than they were previously polled at. In certain embodiments, the system may make a determination regarding polling frequencies of individual components in the set of related components and may apply the polling frequency changes to each related component.

In certain embodiments, device polling rates or frequency is based on performance information for managed entities in a network. For example, a monitoring system may track system metrics using discrete data points that track system performance called events. Events may be issued based on monitoring thresholds. For example, when performance for a particular entity exceeds a threshold, an event may be triggered. Entity polling may be modified based on performance data or events. For example, as events associated with poor system performance are issued, received, or detected, entity polling may be modified responsive to those performance changes.

Figure 2:
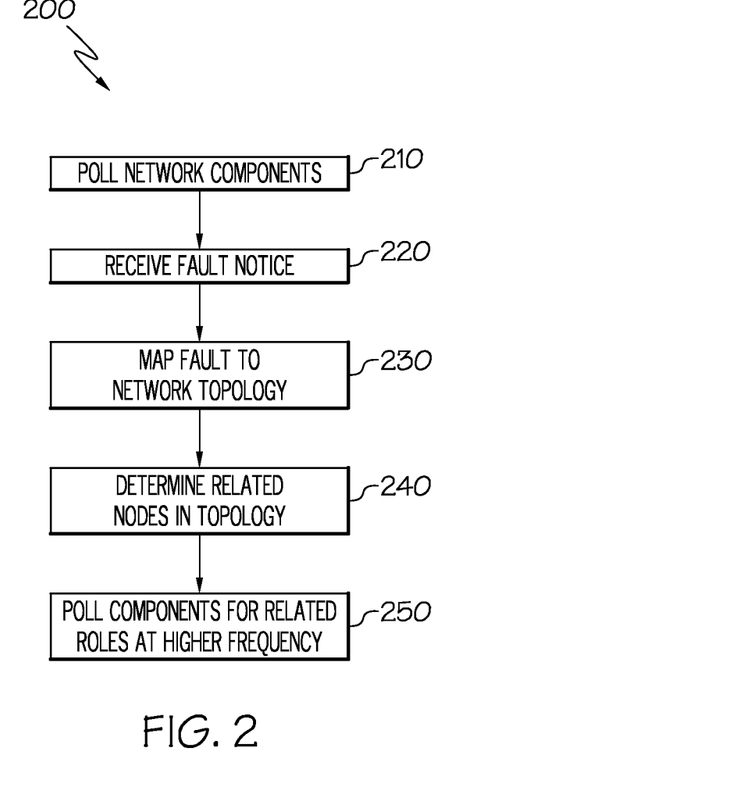
FIG. 2 illustrates a flow chart of a method for dynamic configuration of device polling using network topology in accordance with a non-limiting embodiment of the present disclosure.

With reference to FIG. 2, a method for dynamic configuration of device polling using network topology is illustrated in accordance with a non-limiting embodiment of the present disclosure. At step 210, network components are polled at a particular polling frequency in accordance with a network device infrastructure management application.

At step 220, a fault notice is received from one or more of a component in the network or a component monitoring system that monitors components for the satisfaction of fault conditions and alerts other systems and users. The fault notice may pertain to a particular device or a group of devices or network components.

At step 230, the fault notice is mapped to the network topology. In this step, a determination is made as to which network component to attribute the fault notice to base on the type of fault in the fault notice and other properties of the fault notice. For example, the fault notice may include identifying information that identifies the network component(s) to which the fault should be attributed to. Once the network component is determined, the identified network component is mapped to a network topology map.

At step 240, related nodes in the topology are identified based on connections in the network topology. As described above, edges in the map represent relationships including common properties, attributes, and associations between devices and components in the network topology. At step 250, components for related nodes are polled at an increased frequency level.

Figure 3:
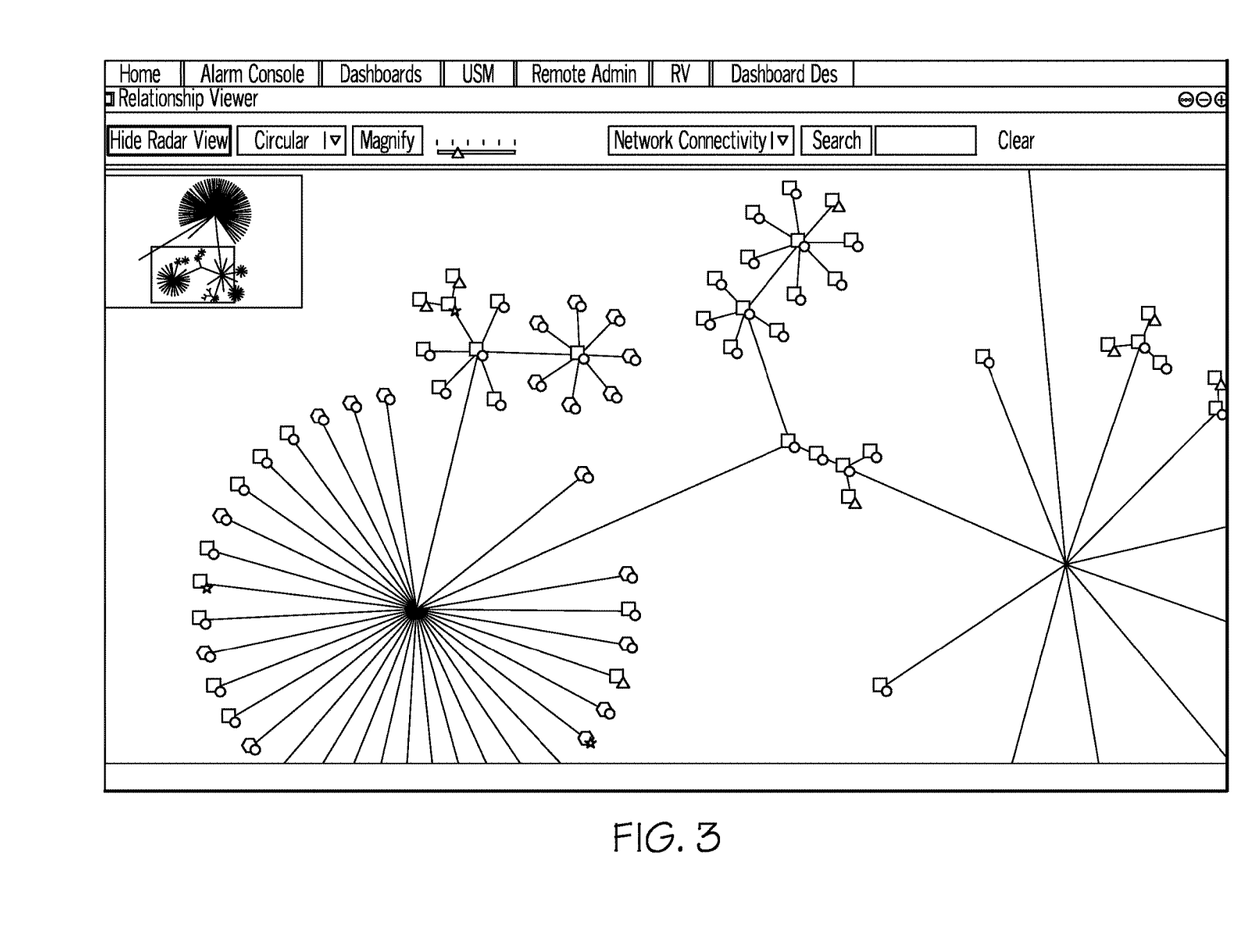
FIG. 3 illustrates an example device topology in a system for dynamic configuration of device polling using network topology in accordance with a non-limiting embodiment of the present disclosure.

With reference to FIG. 3, an example device topology from a user interface of a system for dynamic configuration of device polling using network topology is illustrated in accordance with a non-limiting embodiment of the present disclosure. The device topology includes a series of nodes that each represent devices in a network component device topology. Edges or lines connect the nodes in the topology map. A drop-down is used to select the type of relationships to display in the topology map. For example, in this display, the edges represent network connectivity. Such a display may also be used to illustrate device problems, errors, and faults, and illustrate trending utilization metrics or other performance metrics.

Certain embodiments of the present disclosure may use such a device topology to determine related components when troubleshooting an error and increase the polling frequency for those related components while the error condition exists. The polling frequency for those related components may then be reduced when the error has been addressed or naturally subsides.

Figure 4:
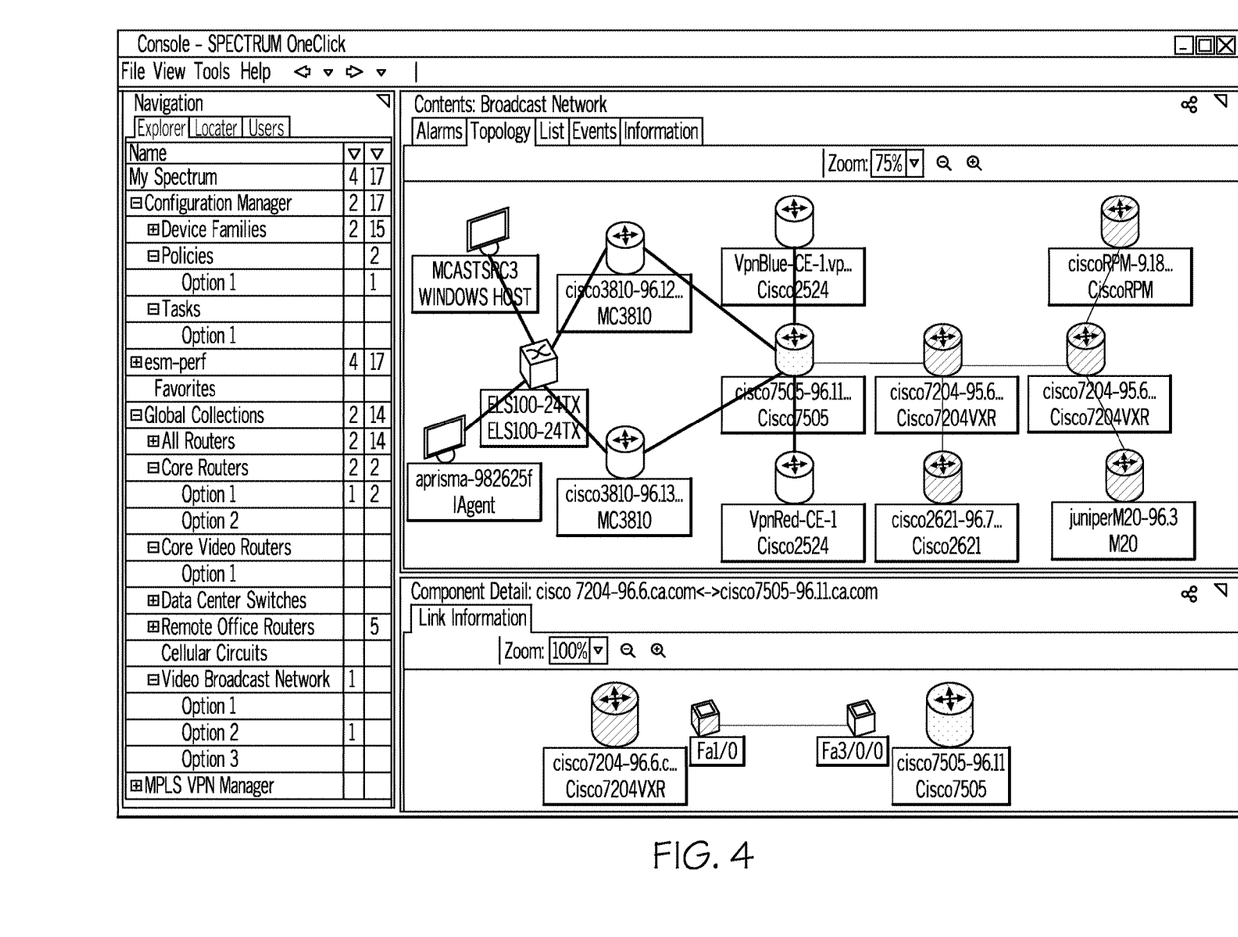
FIG. 4 illustrates a screen shot of an application for viewing device topology in a system for dynamic configuration of device polling using network topology in accordance with a non-limiting embodiment of the present disclosure.
Figure 5:
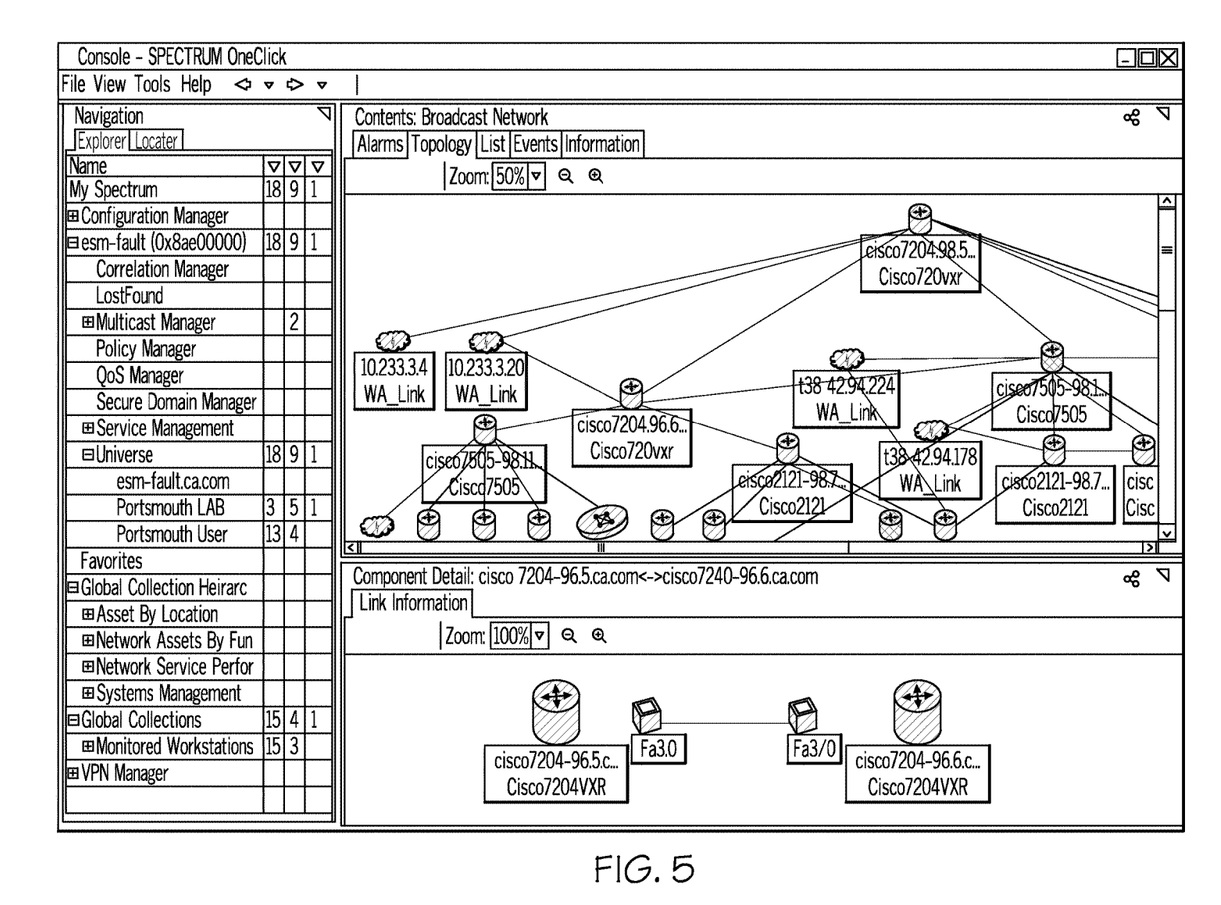
FIG. 5 illustrates a screen shot of an application for viewing device topology in a system for dynamic configuration of device polling using network topology in accordance with a non-limiting embodiment of the present disclosure.

With reference to FIGS. 4-5, several interfaces for viewing and navigating through a device topology in a system for dynamic configuration of device polling using network topology are illustrated in accordance with a non-limiting embodiment of the present disclosure. The main window of the interface illustrates a zoomed in view of the device topology example, such as the one illustrated in FIG. 3. Text boxes describe each device component such as workstations with properties of each device components, such as "WINDOWSHOST", router names such as "CISCO7505", and "AGENT." The network devices or components are connected by edges which define relationships between the various components. The left column depicts a navigation window for quickly navigating through various views of the device topology. Such a navigation view may be helpful for viewing large topology maps for complex infrastructure systems. The topology displayed in this system may be used for determining polling frequency and determining related components based on relationships between components which are represented by edges.

Specialized probes can poll standard or proprietary management information base (MIB) objects from SNMP compliant devices. MIB objects may be monitored for threshold violations and alerts can be generated where necessary. Polled MIB data may be archived for trend reporting and/or may be leveraged for SLA creation, monitoring and reporting. Probes offer a flexible interface for configuring unique MIB object poll requirements and come equipped with a MIB browser.

SNMP-enabled network devices, including routers, switches, servers and printers can be configured to report various error conditions in the form of SNMP traps. Traps are automatically forwarded to a designated server, in most cases, a network management server. Infrastructure management and device polling solutions may include an SNMP trap receiver probe that will listen to certain reconfigurable ports for incoming events. Incoming events are formatted and analyzed for alert generation or are merely archived for trend reporting and other uses.

A trap sniffer probe may be provided for providing real-time sniffing functions. These probes may function by watching network activities in promiscuous mode to see all SNMP traps on the network wire. Trap sniffer probe's may include a user interface for displaying all traps in an active scrolling list, in real-time as they are detected. Detected traps can be added to the infrastructure management system event monitoring system, which enables selection of traps. A monitoring profile is automatically defined for each selected trap, and SNMP event messages can be restructured and customized.

Network monitoring systems often poll various computing components connected to communication networks. These computing components include a plurality of network devices, such as computers, routers, servers, peripheral devices, and the like. Polling devices execute a polling process that polls each of network device in the communication network. For example, polling device 101 sends a polling request to each of the network devices to request communication status and information. Each of the network devices in the communication network include a passive agent. The passive agent may receive the polling request from polling device 101 and may respond with the requested information, such as communication status. Polling device 101 may utilize a Simple Network Management Protocol ("SNMP") for the polling process. Other protocols, such as Hypertext Transfer Protocol ("HTTP"), Simple Object Access Protocol ("SOAP"), and the like, may also be utilized. Polling device 101 may poll the plurality of network devices in the communication network every polling cycle. For example, polling device 101 may send a polling request to each network device every five minutes, when the polling cycle is set at five minutes. These polling requests may result in substantial communication traffic that may overload the communication network.

Polling devices may apply a front loaded polling schedule, in which the polling devices may send requests to each of the network devices in the beginning of the polling cycle in order to complete each polling cycle as quickly as possible. Because all of the requests are sent to the network devices substantially at the beginning of the polling cycle, this front loaded polling schedule may overload the communication network. Thus, in the front-loaded polling schedule, network administration may be required to throttle the network communication to prevent overloading the communication network. Further, latency or retries in polling one network device may delay polling for the other network devices. Thus, administrative personnel may be required to manage latencies and timeouts. Therefore, a front-loaded polling schedule may not be compatible with cloud computing systems or distributed computing systems, such as Software as a Service ("SaaS") subscriber networks, which may require minimal network administration.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   polling a plurality of entities in a network for status information at a first polling frequency;
   receiving a fault indicator associated with a function of a web application hosted by an entity in the network;
   mapping the fault indicator to a particular node in a network topology, the network topology comprising nodes corresponding to entities in the plurality of entities and edges describing relationships and dependencies between the plurality of entities, wherein the particular node corresponds to the associated entity for the fault indicator;
   determining a set of related nodes that would be affected by or would be a potential cause of the fault indicator based on (1) connections to the particular node in the network topology, (2) whether a type of error signified by the fault indicator would impact certain connections or the functioning of a subset of the related nodes, and (3) whether the edge between the particular node and any related nodes describes a service-relationship associated with the function of the web application; and
   in response to receiving the fault indicator, polling corresponding entities for the set of related nodes for status information at a second polling frequency while polling corresponding entities for unrelated nodes at the first polling frequency, the second polling frequency being greater than the first polling frequency.

2. The method of claim 1, further comprising:
   receiving information indicative of a root cause of the fault indicator;
   determining a group of nodes in the first set that are associated with the root cause of the fault indicator based on the connections to the particular node in the network topology; and
   polling the corresponding entities for the group of nodes for status information at a third polling frequency, greater than the second polling frequency.

3. The method of claim 1, further comprising:
   ranking each node in the set of related nodes with respect to their criticality regarding the fault indicator based on relationships and dependencies with the particular node; and
   polling the corresponding entity for each node in the set of related nodes at a respective frequency based on the ranking.

4. The method of claim 1, further comprising:
   determining a root cause of the fault indicator based on the status information for the corresponding entities for the set of related nodes; and
   modifying the set of related nodes to include other nodes associated with the root cause of the fault indicator.

5. The method of claim 1, further comprising:
   receiving an indication that a fault associated with the fault indicator has been resolved; and
   polling the corresponding entities for the set of related nodes at the first polling frequency.

6. The method of claim 1, wherein polling the corresponding entities for the set of related nodes further comprises polling for resource utilization and entity failure.

7. The method of claim 1, wherein the status information for the corresponding entities for the set of related nodes comprises failure information, resource utilization information, performance information, events, and bandwidth usage information.

8. A computer configured to access a storage device, the computer comprising:
   a processor; and
   a non-transitory, computer-readable storage medium storing computer-readable instructions that when executed by the processor cause the computer to perform:
      polling a plurality of entities in a network for status information at a first polling frequency;
      receiving a fault indicator associated with a function of a web application hosted by an entity in the network;
      mapping the fault indicator to a particular node in a network topology, the network topology comprising nodes corresponding to entities in the plurality of entities and edges describing relationships and dependencies between the plurality of entities, wherein the particular node corresponds to the associated entity for the fault indicator;
      determining a set of related nodes that would be affected by or would be a potential cause of the fault indicator based on (1) connections to the particular node in the network topology, (2) whether a type of error signified by the fault indicator would impact certain connections or the functioning of a subset of the related nodes, and (3) whether the edge between the particular node and any related nodes describes a service-relationship associated with the functioning of the web application; and in response to receiving the fault indicator, polling corresponding entities for the set of related nodes for status information at a second polling frequency while polling corresponding entities for unrelated nodes at the first polling frequency, the second polling frequency being greater than the first polling frequency.

9. The computer of claim 8, wherein the computer-readable instructions further cause the computer to perform:
receiving information indicative of a root cause of the fault indicator;
determining a group of nodes in the first set that are associated with the root cause of the fault indicator based on the connections to the particular node in the network topology; and
polling the corresponding entities for the group of nodes for status information at a third polling frequency, greater than the second polling frequency.

10. The computer of claim 8, wherein the computer-readable instructions further cause the computer to perform:
ranking each node in the set of related nodes with respect to their criticality regarding the fault indicator based on relationships and dependencies with the particular node; and
polling the corresponding entity for each node in the set of related nodes at a respective frequency based on the ranking.

11. The computer of claim 8, wherein the computer-readable instructions further cause the computer to perform:
determining a root cause of the fault indicator based on the status information for the corresponding entities for the set of related nodes; and
modifying the set of related nodes to include other nodes associated with the root cause of the fault indicator.

12. The computer of claim 8, wherein the computer-readable instructions further cause the computer to perform:
receiving an indication that a fault associated with the fault indicator has been resolved; and
polling the corresponding entities for the set of related nodes at the first polling frequency.

13. The computer of claim 8, wherein polling the corresponding entities for the set of related nodes further comprises polling for resource utilization and entity failure.

14. The computer of claim 8, wherein the status information for the corresponding entities for the set of related nodes comprises failure information, resource utilization information, performance information, events, and bandwidth usage information.

15. A computer program product comprising:
a computer-readable storage medium having computer-readable program code embodied therewith, the computer-readable program code comprising:
computer-readable program code configured to poll a plurality of entities in a network for status information at a first polling frequency;
computer-readable program code configured to receive a fault indicator associated with a function of a web application hosted by an entity in the network;
computer-readable program code configured to map the fault indicator to a particular node in a network topology, the network topology comprising nodes corresponding to entities in the plurality of entities and edges describing relationships and dependencies between the plurality of entities, wherein the particular node corresponds to the associated entity for the fault indicator;
computer-readable program code configured to determine a set of related nodes that would be affected by or would be a potential cause of the fault indicator based on (1) connections to the particular node in the network topology, (2) whether a type of error signified by the fault indicator would impact certain connections or the functioning of a subset of the related nodes, and (3) whether the edge between the particular node and any related nodes describes a service-relationship associated with the function of the web application; and
computer-readable program code configured to poll corresponding entities for the set of related nodes for status information at a second polling frequency, the second polling frequency being greater than the first polling frequency.

16. The computer program product of claim 15, wherein the computer-readable program code further comprises:
computer-readable program code configured to receive information indicative of a root cause of the fault indicator;
computer-readable program code configured to determine a group of nodes in the first set that are associated with the root cause of the fault indicator based on the connections to the particular node in the network topology; and
computer-readable program code configured to poll the corresponding entities for the group of nodes for status information at a third polling frequency, greater than the second polling frequency.

17. The computer program product of claim 15, wherein the computer-readable program code further comprises:
computer-readable program code configured to rank each node in the set of related nodes with respect to their criticality regarding the fault indicator based on relationships and dependencies with the particular node; and
computer-readable program code configured to poll the corresponding entity for each node in the set of related nodes at a respective frequency based on the ranking.

18. The computer program product of claim 15, wherein the computer-readable program code further comprises:
computer-readable program code configured to determine a root cause of the fault indicator based on the status information for the corresponding entities for the set of related nodes; and
computer-readable program code configured to modify the set of related nodes to include other nodes associated with the root cause of the fault indicator.

19. The computer program product of claim 15, wherein the computer-readable program code further comprises:
computer-readable program code configured to receive an indication that a fault associated with the fault indicator has been resolved; and
computer-readable program code configured to poll the corresponding entities for the set of related nodes at the first polling frequency.

20. The computer program product of claim 15, wherein polling the corresponding entities for the set of related nodes further comprises polling for resource utilization and entity failure.

* * * * *